Feb. 10, 1931.　　B. D. HORTON　　1,792,424
ELECTRICAL SERVICE INSTALLATION
Original Filed Feb. 23, 1924　　2 Sheets-Sheet 1
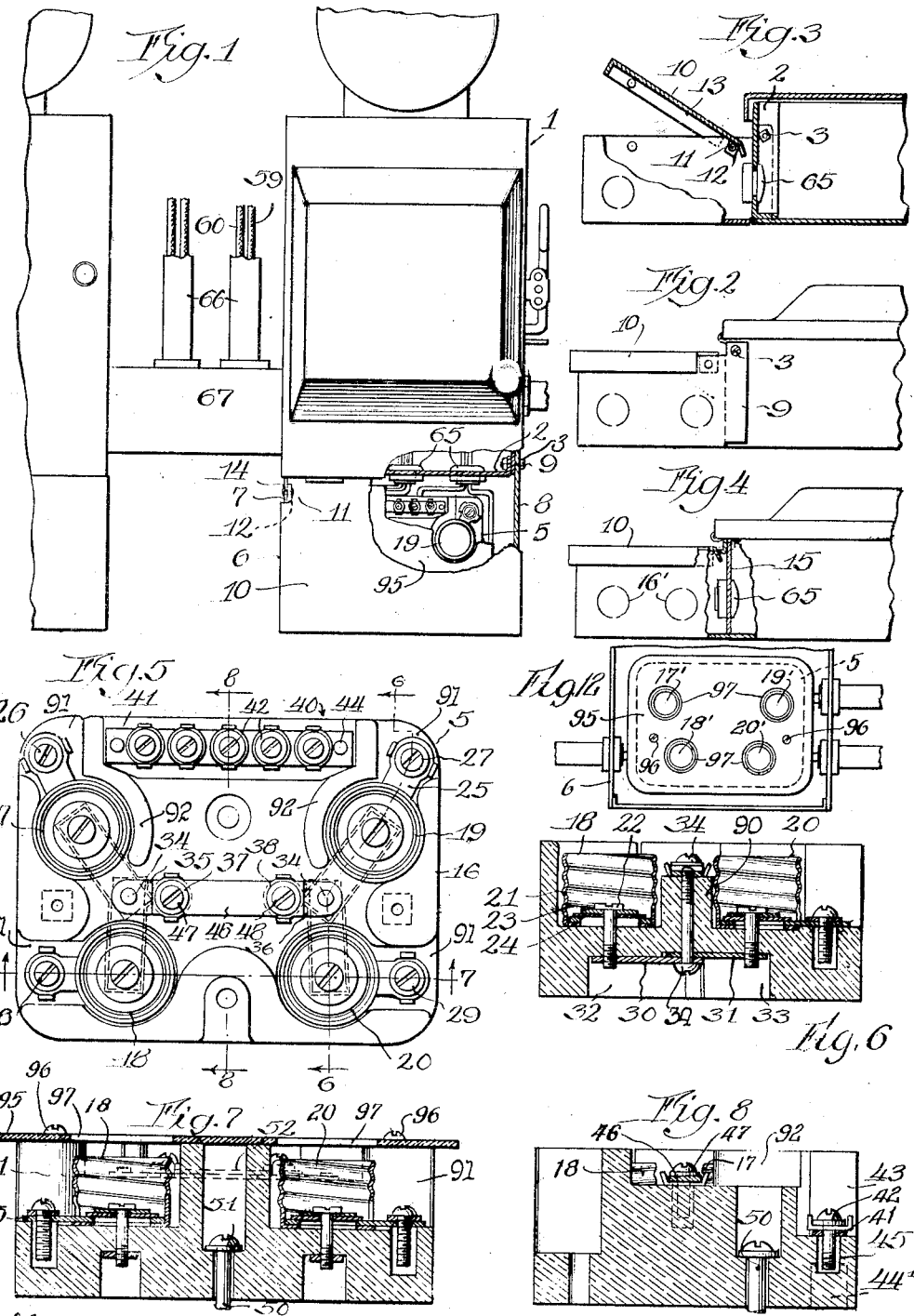

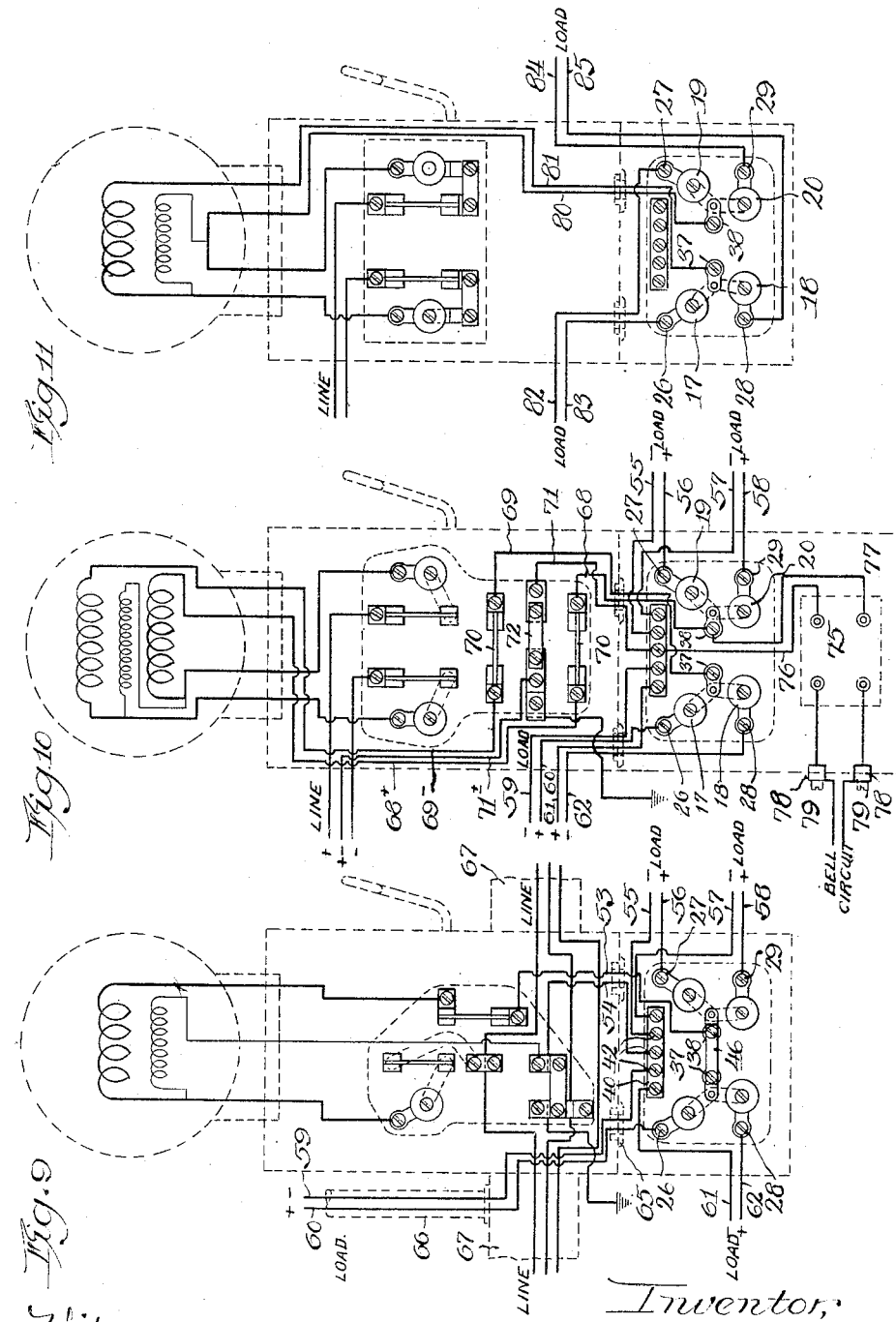

Patented Feb. 10, 1931

1,792,424

UNITED STATES PATENT OFFICE

BRYSON D. HORTON, OF DETROIT, MICHIGAN, ASSIGNOR TO SQUARE D COMPANY, OF DETROIT, MICHIGAN, A CORPORATION OF MICHIGAN

ELECTRICAL SERVICE INSTALLATION

Application filed February 23, 1924, Serial No. 694,656. Renewed October 14, 1930.

My invention relates to electrical service installation, and more particularly to a complete unitary service installation involving a distributing center capable of fulfilling the usual requirements of electric service for apartment houses, residences and other places, where numerous branch load circuits are supplied, more or less in a limited number from each center.

In the ordinary type of commercial distributing center the branch circuits of each customer are fed from an individual center, which center commonly is cut-out blocks of porcelain having two or more branch wire connections. But a main circuit entrance installation and a separate multi-branch circuit installation combined into one unit have heretofore never been provided. The common practice has been to provide a separate distributing cabinet from which the branch circuits were run.

The installing of this apparatus as a unitary installation will reduce installation costs and result in simpler wiring connections, making an ideal arrangement where the switches are ganged, as in apartment houses.

It is essential from a commercial, as well as from an engineering standpoint, that each installation maintain this unitary character from the outset. It has never before been recognized that in order to assure the proper unitary arrangement of the equipment of each installation, as and when mounted, it is essential for this equipment to be furnished to the contractor, so that he may, if so desired, acquire it in unit form, thus necessitating merely the making of the proper wiring connections by the workmen. Apartments and dwelling houses usually require bell-ringing transformers as a part of this equipment, but heretofore they have never had a fixed relation with the distributing cabinet. When installing the bell transformer, the contractor had to run a separate circuit to the transformer, and place the transformer wherever it was convenient, but this resulted in great inconvenience with respect to the entire mounting of the equipment.

The trend of development at the present time is for providing the service entrance switch within an iron clad enclosure which is normally locked or sealed closed, as it should be. The main line fuses are thereby rendered inaccessible, and according to the best engineering practice they should be. The National Electrical Code, in cognizance thereof, has, however, required that in such instances auxiliary fuses should be provided for the customers' load circuits, which fuses are to remain unsealed and be provided within a metal enclosure.

As a further trend of development, there is a tendency to omit fuses on the grounded neutral wire of house distributing systems where this neutral wire is carried to the shell of the lamp socket, and not to its center terminal; and, too, where the neutral wire is properly identified throughout—sanction being required, however, in these cases, from the inspection department having jurisdiction, according to the National Electrical Code. This will, of course, from now on effect numerous changes in the requirements of fuse cut-out blocks. As I shall presently describe, the present invention provides a novel form of fuse cut-out block which is so designed that it embodies these new requirements in a manner affording utmost simplicity, maximum efficiency and capacity, as well as certain other advantages apparent to those skilled in the art.

It is one of the objects of my invention to provide a practicable and improved unitary service entrance installation, which is complete, and which will avoid the difficulties and objections heretofore encountered.

In carrying out my invention, I provide one or more units connected in gang arrangements, each unit having a distributing cabinet or compartment in which the distributing center is located, the arrangement affording an exceedingly efficient wiring layout and allowing the branch wires to be led from the same in any direction, that is, from the service switch enclosure, distributing cabinet, or the interconnecting troughs between units, to prevent the crossing of these wires outside of the installation.

It is an important feature of my invention that each complete unitary service entrance installation is provided with a service switch compartment, and with a distributing cabinet compartment, whether these two compartments are obtained in a single cabinet, or in separate enclosures suitably connected together. I wish to point out that the manufacturer of these may furnish to the contractor separate distributing cabinets with the circuit controlling apparatus of the distributing center provided therein, this apparatus including fuse cut-out blocks, as well as transformers for the house bell, if so desired, so that the contractor may unite this cabinet with service switch enclosure, and thereby obtain a complete unitary service entrance enclosure. On the other hand, both compartments may be within a single enclosure, if this is deemed preferable. In either event, the door of the switch compartment will preferably be provided with means for sealing or locking it closed, to prevent access to the interior by the customer. The door of the distributing cabinet will not be provided with means to lock it closed, but will preferably be accessible at all times, so that the customer will have access to the auxiliary fuses in the branch circuits.

Another object of my invention is to provide a fuse cut-out block of unique design, which is simple, inexpensive and efficient. For the particular arrangement of the parts, it affords a maximum capacity. Further, a decidedly important advantage is obtained in that the branch circuits may be taken off in different directions, and lead directly from the enclosure without requiring a multitude of cross-wires without the box.

A further object is to provide a dead front construction on the fuse cut-out block whereby the entire front of the latter is rendered dead. In order to accomplish this the base is arranged so that the service and terminal wires lead to and away from the block in back of the dead front, and the wire connecting terminals are at a different level than the outer face of the block. The dead front comprises generally an apertured insulating plate through which the fuse plugs may be inserted and removed from the fuse receptacles, the insulating plate being secured to the outer face of the block and protruding a distance sufficient about the edges thereof to prevent an inexperienced person from coming in contact with the live parts covered by the plate.

Other objects and advantages of the invention will be obvious from the accompanying description setting forth in more detail such objects and advantages in the manner in which the same are realized, and also from the accompanying drawing illustrating the embodiment of the invention, as well as modifications of certain features thereof.

In the drawings:

Figure 1 is a front elevational view of a plurality of unitary service entrance installations connected in the gang arrangement by suitable interconnecting troughs, a portion of the service switch enclosure cover and distributing cover of one unit being broken away to illustrate the manner of attaching the enclosure and cabinet together;

Fig. 2 is a side elevation of a portion of one of these units;

Fig. 3 is a similar view, but partly in cross-section to illustrate the manner of attaching the distributing cabinet to the service switch enclosure by means of the bottom end wall fastening screws; the distributing cabinet thus far illustrated is made separate from the service switch enclosure and is capable of ready attachment thereto;

Fig. 4 is a view similar to Figs. 2 and 3, having a portion broken away to illustrate the manner of forming the service entrance installation as an integral unit (making the distributing cabinet an integral part of the service switch enclosure) by providing two compartments separated by a suitable partition, one for the service switch and the other for the distributing center;

Fig. 5 is a top plan view of the branch fuse cut-out employed herein;

Fig. 6 is a cross-sectional view taken on line 6—6 of Fig. 5;

Fig. 7 is a similar view taken on line 7—7 of Fig. 5;

Fig. 8 is also a similar view but taken on line 8—8 of Fig. 5;

Fig. 9 is a wiring diagram embodying my improved service entrance installation in a three to two-wire gang installation, having three feeders;

Fig. 10 is a wiring diagram embodying my invention in a three to two-wire electric wiring system;

Fig. 11 is a still further form of wiring diagram in which my improved invention may be embodied, the wiring thereof being unidentified, but employing a two to two-wire electric wiring system; and Fig. 12 is a top plan view of a cut-out block provided with a dead front construction to conceal the live parts on the block and to render the front thereof dead.

My invention comprises essentially an electrical distributing system involving cabinet units in gang arrangement connected by troughs through which the service wires are led. Each of the cabinets comprises at least two portions, one constituting a distributing center for a predetermined number of branch circuits, and also a bell transformer if so desired, and the other an enclosure normally locked closed and containing a service switch for controlling the current supply from the line circuit to the branch circuits. The distributing center is so designed and arranged that the branch circuit wires may be led from each cabinet unit in any direction, that is, from the enclosure of the distributing center itself, the service switch enclosure, or the troughs interconnecting the various cabinet units, to prevent the crossing of these wires outside of the installation.

I consider this feature of particular novelty because it teaches the use of leading branch circuit wires from between the various cabinet units through conduits connected to interconnecting troughs. So far as I am aware this feature is new in connection with the present disclosure, and, therefore, I intend claiming the same broadly.

The service switch enclosure 1 is of standard construction and is provided with a removable end wall plate 2, fitted in the bottom thereof, and detachably secured by means of fastening screws 3. It will of course be understood, that it is not essential for the enclosure 1 to be provided with the removable end wall 2. The provision of the removable end wall 2 is, however, a common practice at the present day, and insures certain marked advantages, apparent to those skilled in the art.

The service switch which I contemplate using may be of any design, this depending of course upon the electric wiring system in which the installation is inserted.

In Fig. 9 I have illustrated a type of service switch disclosed and claimed by me in my copending application Serial No. 622,522, filed March 3, 1923, while in Fig. 10 the service switch is that which I have disclosed and claimed in my co-pending application Serial No. 627,082, filed March 23, 1923.

By referring to Figs. 9 to 11 inclusive it will be apparent from the diagrams therein shown that the type of service switch to be used is entirely dependent upon the requirements of the particular installation.

The distributing center comprises a branch fuse cut-out 5, which I shall hereinafter describe, disposed in the distributing cabinet 6. This distributing cabinet may be attached to the lower end of the service switch enclosure 1 in any suitable manner. In certain instances it is preferable to make it integral with the service switch enclosure 1, as illustrated in Fig. 4, and provide a suitable partition 15, while in other instances it is desirable to detachably secure it to the enclosure 1. In case it is detachably secured, the distributing cabinet 6 is provided with an open side, which is fitted against the lower end of the enclosure 1. The sides 7 and 8 of this enclosure 6 are provided with flanges 9, which are adapted to embrace the lower side portions of the switch enclosure, when the distributing cabinet 6 is mounted. The end wall fastening screws are first removed to allow the flanges 9 to fit closely against the sides of the switch enclosure 1. The screws 3 are then replaced, being allowed to pass through apertures fitted in the flanges for this purpose.

The cover 10 of the distributing cabinet 6 is suitably hinged at 11. This may be accomplished by offsetting a portion of the cover flange 13 to form tangs 12 that lie against the inside of the cabinet walls 7 and 8. Suitable rivets 14 may then be employed to serve as the pivots.

As illustrated in Fig. 1, the branch-cutout 5 is preferably positioned in the metallic distributing cabinet 6, fitted with suitable knockouts, such as 16′, and adapted to receive the conduits through which the branch wires are led.

The branch-cutout 5 comprises an insulating base 16, composed of any suitable insulating compound, on which are mounted the desired fuse receptacle terminals and their interconnections. In the preferred form of cutout, herein illustrated, fuse receptacles adapted to receive the Edison plug fuses are represented, but obviously any other type of fuse could be utilized.

On the base 16, in the preferred embodiment, are positioned Edison plug fuse receptacles 17, 18, 19 and 20. Each of these fuse receptacles comprises a threaded shell contact 21 and a center contact 22. The center contact 22 consists of a flat headed screw which rides a metallic washer 23, the washer 23 resting on an insulating washer 24, which in turn rests upon a metallic extension of a conducting bar 25 (see Fig. 7). This extension is in direct contact with the base portion of the threaded shell contact 21. Obviously, any other construction of Edison plug fuse receptacle, or any other type, could be readily utilized. The conducting bars 25 of each fuse receptacle terminate in wire receiving terminals 26, 27, 28 and 29.

The center contact screws 22 of the fuse receptacles are threaded into metallic conducting bars 30 and 31, positioned in suitable recesses 32 and 33 fitted in the rear face of mounting base 16. The conducting bars 30 and 31 are provided with a perforation through which screws 34 are fitted, which screws extend to the top face of the mounting base 16 and are there threaded into conducting bars 35 and 36 connected to wire terminals 37 and 38. From this construction it will be evident that the center contacts 22 of the fuse receptacles 17 and 18 are made common and interconnected by their conducting bare 30 and 31, which bars are connected to the common terminal 37. Likewise, the center contacts 22 of the fuse receptacles 19 and 20 are made common and interconnected by their conducting bars 30 and 31, which bars are also connected to the common terminal 38.

A neutral bus 40 is disposed at one side of base 16, this neutral bus comprising a conducting bar 41 to which a plurality of wire terminals 42 are connected. This neutral bus 40 will in all cases be connected in the grounded neutral side of a 3 or 2-wire circuit. A depression 43 of considerable depth is provided at one side of base 16 for receiving the neutral bus 40 (see Fig. 8), thus allowing space sufficient to prevent the short circuiting of the current between this bus and any of the other terminals on the base. As illustrated in Fig. 8, any suitable means may be provided to secure the bus 40 to the base. In the drawings, however, I have shown a depression 44' on the under side of the base 16 at one side through which a suitable bolt 44 may extend in an upward direction, so that its end will thread into the bus 40.

I wish to call attention to the particular design of base 16; of the arrangement of the various fuse receptacles; the wire receiving terminals 26, 27, 28 and 29; the removable strap 46; and the neutral bus 40, all of which are of such character that the branch cut-out will be of maximum capacity and efficiency, as well as being simple in design, and exceedingly cheap to manufacture.

The wire terminals 37 and 38 are so positioned on the mounting base 16 that the medial line of their associated conducting bars 35 and 36 are in substantial alignment, and consequently the wire terminals 37 and 38 are aligned to receive, when desired, the connecting link or removable strap 46. This connecting link or removable strap 46 is fitted with apertures at either end, adapted to receive the shanks of the screws 47 and 48 associated with the wire terminals 37 and 38 respectively, which screws serve to securely interconnect the removable strap with the respective conducting bars 35 and 36 of terminals 37 and 38. With the link 46 in position, as illustrated in Figs. 5 and 9, the cut-out is arranged for two-wire service, except in Fig. 9 where the two-wire service having three feeders is used; and with the link removed, as shown in Fig. 10, the cut-out is arranged for three-wire service, the branch circuits in such cases being arranged for two-wire service.

The branch cut-out may be secured within the distributing cabinet 6 in any suitable manner, but is preferably done by screws such as 50 and the cooperating washers 51, which fit in suitable depressions such as 52, positioned in the mounting base 16, so that the screws and washers will be positioned well below the top face of the mounting base 16.

If the branch cut-out is to be used with a two-wire service circuit having three feeders, the connections are made as illustrated in the Fig. 9. Under these circumstances, as hereinbefore stated, the removable strap 46 is retained in position by the wire terminals 37 and 38, thereby interconnecting these two terminals and the center contacts 22 of all the receptacles.

One lead of the service circuit, coming from the service switch such as 53, is then connected to either the terminal 37, or the terminal 38, and the other lead 54 of the service circuit is connected to the center terminal 42 on the neutral bus 40.

In view of the use of the neutral bus strap 40 and a single fuse in each branch circuit, this fuse being in the live wire of the circuit, this particular arrangement of the cut-out permits four branch circuits to be fed therefrom.

One lead 55 of the fuse branch circuit is connected to the first wire terminal 42, to the right of the center wire terminal on the neutral bus 40, and the other lead 56 of that branch circuit is connected to the wire terminal 27. In a like manner one lead 57 of the second branch circuit is connected to the second wire terminal 42, to the right of the center wire terminal on the neutral bus 40; and the other lead 58 of that branch circuit is connected to the other wire terminal 29. As for the third branch circuit the neutral lead 59 is connected to the first wire terminal 42 on the left-hand side of the center wire terminal on the neutral bus 40, and the other lead 60 of the same branch circuit is connected to the wire terminal 26. The fourth branch circuit has one of its leads 61 connected to the extreme left-hand terminal 42 on the neutral bus 40, and the other lead of this branch circuit is connected to the wire terminal 28.

When the branch fuse cut-out is thus connected, power from the service circuit, through the service switch, will be delivered to the four branch circuits over circuits which may be traced as follows:

Current will flow from the service lead 53 to the terminal 37 or 38, thence through the conducting bar 36, at which place the current will be divided to flow in two different directions for supplying two branch circuits. In one instance, the current will flow through the conducting bar 31 to the center contact 22 of the receptacle 19, through the fuse plug to the threaded shell contact 21, thence through the conducting bar 25 to the wire terminal 27, and out over the branch circuit lead 56, through the branch circuit and back over the opposite branch circuit wire 55 to the wire terminal 42 on the neutral bus 40, to which is connected the opposite service lead 54.

In the other instance, the current flows through the conducting bar 30 to the center contact 22 of the receptacle 20, through the fuse plug to the threaded shell contact 21, thence through the conducting bar to the terminal 29 and out over the branch circuit lead 58 through the branch circuit and back over the opposite branch circuit wire 57 to the other wire terminal 42 on the neutral bus 40, the current returning through the opposite service lead 54 to the service circuit.

For the branch circuits on the opposite side of the block, the current flows across the interconnecting link 46 to the terminal 37, where it is likewise divided for delivering current to the remaining two branch circuits. The current flows over these two branch circuits in substantially the same manner as described in connection with the first two branch circuits. It is, therefore, deemed unnecessary to repeat the tracing of the current over branch circuit wires 59 and 60, and 61 and 62.

The position of the neutral bus 40 and the two-wire terminals 27 and 29 permit two branch circuits to be taken off the fuse cut-out on the right-hand side of the installation without requiring the leads of these branch circuits to cross each other on the outside of the installation in order to be led in the proper direction over the distributing system.

In like manner the two opposite branch circuits will be led directly from the distributing cabinet 6; and one or both of them may be led back into the switch enclosure 1, through suitable porcelain bushed knockouts 65, from which switch enclosure 1 they may then be led through conduits 66 connected to the interconnecting troughs 67, as illustrated in Fig. 1 or in Fig. 9.

When the service circuit is of the three-wire type, the interconnecting link 46 is removed and the apparatus is wired as illustrated in Fig. 10. In this instance, the positive wire 68 of the three-wire circuit is connected to the wire terminal 38 (through a suitable meter load disconnecting switch 70 positioned between the meter and the branch circuits), thence to both fuse receptacles 19 and 20, terminals 27 and 29, respectively, and out over the branch circuit leads 56 and 58, through the two branch circuits, and back over the opposite leads 55 and 57, to the respective wire terminals 42 on the neutral bus 40. The neutral wire 71 passes through a connection 72 on the service switch and connects to the center wire terminal 42 on this neutral bus 40.

The negative wire 69 of this three-wire circuit is connected through a similar meter load disconnecting switch 70, to the terminal 37, where the current is divided, flowing through the fuse receptacles 17 and 18, to the wire terminals 26 and 28, respectively, and out over the branch circuit leads 60 and 62, through the branch circuit, and out over the two opposite leads 59 and 61, and to the respective wire terminals 42 on the neutral bus 40.

The distributing cabinet 6, employed in the embodiment illustrated in Fig. 10, is adapted to carry a bell transformer 75. The leads 76 and 77 of the primary circuit of this transformer 75 may be connected to one of the wire terminals 42, and to either one of the terminals 37 or 38. Suitable porcelain bushings 78, provided with the proper wire connections 79, are fitted in one side of the cabinet 6, so that all that remains to be done by workmen on the job is to run the bell wire circuit wires from these connections 79 on the cabinet to the bell.

The primary connections 76 and 77 will be made by the manufacturer, and consequently, it will not be necessary for the contractor to install a separate circuit which must be run to the transformer, as is now the practice.

The transformer 75 is enclosed in a metal case, being a part of the distributing center housed within the distributing cabinet 6.

The embodiment shown in Fig. 11 illustrates an electrical distributing system involving a two-wire service, having its wires unidentified and supplying but two branch circuits. One of the service leads 80 is connected to the wire terminal 38, and the other service lead is connected to the wire terminal 37. In this instance the link 46 is removed and no connections to the neutral bus 40 are made.

As before explained, the code permits the omission of fuses in branch circuits on the neutral side only where the neutral wire is identified throughout the circuits. If the neutral wire is unidentified, as illustrated in Fig. 11, the neutral bus is preferably not used.

The fuse receptacles 17 and 19 are positioned in the opposite sides of one of the branch circuits, these circuits being identified by the lead wires 82 and 83, and the fuse receptacles 18 and 20 are positioned in the opposite sides of the other branch circuit, which is designated by the leads 84 and 85.

These circuits may be traced as follows:

From the service lead 80 the current will flow to the terminal 38 and there be divided, going one way through the fuse receptacle 19 to the terminal 27, and over the branch circuit by way of the branch circuit lead 82, and return by way of the opposite branch circuit lead 83, to the terminal 26, through the fuse receptacle 17, the conducting bar 31, to the terminal 37, and back to the service switch by means of the service wire 81.

At the terminal 38 the current will also flow through the conducting bar 30 to the fuse 20, the terminal 29, and over the branch circuit, through the branch circuit lead 84, returning by way of the opposite branch circuit lead 85 to the terminal 28, through the fuse receptacle 18 and conducting bar 30, to the terminal 37 and back to the service circuit over the wire 81.

I have hereinbefore referred to the branch fuse cut-out block 5 as having a maximum capacity. This is in reference to the number of branch circuits capable of being fed from a block having a base of the size shown. The arrangement of the wire connecting terminals, fuse receptacles, terminals 37 and 38 and the neutral bus 40 enter into the accomplishment of this feature. The terminals are spaced a maximum distance apart, with sufficient air-spaces therebetween to prevent short circuiting of the current. In this connection, the neutral bus 40 is sunk in a recess 43, preferably of maximum depth. The fuse receptacles are also sunk in recesses spaced, or separated, by the upstanding projection 90 formed integrally with base 16, which is of insulating material. To prevent the branch circuit wires within the cabinet 6 from dropping over and upon a terminal other than the one to which it connects, recesses 91 at the four corners of the block are provided, and in these recesses the branch circuit wires are led and guided. To prevent the wires of the two upper branch circuits from contacting with and short circuiting the current across the common neutral bus 40, upstanding projections 92 are formed integral with the base between the fuse receptacles 17 and 19 and the neutral bus 40.

The front of the base 16 is preferably rendered dead by means of a dead front construction, comprising an insulating plate 95, suitably secured at 96 to the base 16. Insulating plate 95 is provided with a plurality of apertures 97 through which the fuses 17′, 18′, 19′ and 20′ are inserted for attachment to the fuse receptacles 17 to 20, inclusive. Thus these fuses are accessible and may be changed without necessarily removing the plate 95. It is desirable to permit the plate 95 to protrude about edges of the base 16 a distance sufficient to prevent contact with the live parts on the base.

From the foregoing description it will be apparent that the electrical distributing system disclosed herein is one which may be built up of separate cabinet units, each cabinet constituting a complete unitary service entrance installation for a certain number of branch circuits.

The unitary character of each installation resides in furnishing the service switch enclosure and the distributing cabinet as a unit, with their parts completely assembled and ready to be put into service as soon as the proper wiring connections are made.

The manner of connecting the distributing cabinet and service switch enclosure is particularly unique and advantageous, because it permits separate use of the service switch enclosure when desired, while the distributing cabinet may be associated therewith, at any time, by means of end wall fastening screws (in general use at the present), which screws may be removed and passed through apertures fitted in flanges extending upwardly from the distributing cabinet to embrace the lower end of the service switch enclosure.

The distributing center, illustrated in connection with this disclosure, comprises a novelly designed branch fuse cut-out block for use with each unitary service entrance installation cabinet. These cabinets have the service switch normally inaccessible and the line fuses concealed whereby branch circuit fuses are furnished and are left accessible by placing the branch fuse cut-out block within the distributing cabinet, the cover of which remains unlocked. Each branch circuit is protected by a fuse in its live wire. The dead or neutral wires of all the branch circuits fed from the block lead to a common neutral bus. The design of the block is thereby simplified considerably, resulting in a construction having greater efficiency and advantages both from the practical and engineering standpoint.

It is believed that the structural principles underlying this invention, its fundamental theory and the merits and advantages it possesses will be clear to those skilled in the art without further detailed description or elaboration of other equivalent specific forms in which the invention may find expression. Hence, without limiting the invention to any or all of the particular embodiments thereof, herein selected for purposes of illustration and description.

I claim:

1. A service entrance installation comprising a service switch enclosure, a removable end wall, means for securing said end wall to said enclosure, and a cabinet adapted to be attached to one end of said service switch enclosure, said cabinet being held in position against said service switch enclosure by said means securing said removable end wall to the switch enclosure.

2. A service entrance installation comprising a service switch enclosure, a removable end wall, means for securing said end wall to said enclosure, and a cabinet adapted to be attached to one end of said service switch enclosure, and means for fastening said cabinet to said service switch enclosure including flanges on said cabinet embracing one end of said service switch enclosure for interconnection with said end wall securing means.

3. An electrical apparatus housing comprising a service switch enclosure including a hinged door constituting the front wall thereof and having one end open, a removable end wall for said open end, a distributing center enclosure having an open end and comprising side walls extending beyond the plane of said open end and a hinged door constituting the front wall thereof, said extending side walls of said distributing center enclosure being adapted to embrace the side walls of said service switch enclosure adjacent the open end thereof, and common means for securing said extending side walls of said distributing center enclosure and said removable end wall to the side walls of said service switch enclosure.

4. An electrical apparatus housing comprising a service switch enclosure having an end wall with an aperture therein for the accommodation of electrical conductors, a distributing center enclosure having an open end and side walls projecting beyond the plane of said end and adapted to embrace the side walls of said service switch enclosure, and means for securing the projecting portions of the side walls of said distributing center enclosure to the side walls of said service switch enclosure to form a cabinet having two compartments separated by the said end wall of said service switch enclosure.

5. An electrical apparatus housing comprising a service switch enclosure having an open end, a removable end wall having flange portions bent at substantially right angles to the main portion thereof and lying against the inner surfaces of the side walls of the service switch enclosure, a distributing center enclosure having an open end and side walls extending beyond the plane of said open end and embracing the side walls of said service switch enclosure adjacent the open end thereof, and fastening means extending through the extending portions of the side walls of said distributing center enclosure, the side walls of said service switch enclosure, and the flange portions of said removable end wall, to secure said removable end wall and said distributing center enclosure to said service switch enclosure.

In witness whereof, I have hereunto subscribed my name.

BRYSON D. HORTON.